United States Patent Office 2,992,940

Patented July 18, 1961

2,992,940

TREATMENT OF CELLULAR MATERIALS

Henry A. Pace, Akron, Ohio, assignor to The Goodyear Tire & Rubber Company, Akron, Ohio, a corporation of Ohio No Drawing. Continuation of application Ser. No. 544,421, Dec. 21, 1955. This application Jan. 23, 1957, Ser. No. 635,577

2 Claims. (Cl. 117—98)

This invention relates to the treament of elastomeric flexible cellular structures. More particularly, it relates to the treatment of flexible cellular structures prepared from liquid reaction mixtures of active-hydrogen-containing polymeric materials, polyisocyanates and water. Still more particularly, it relates to the treatment of flexible cellular structures prepared from active-hydrogen-containing polymeric materials, polyisocyanates and water whereby improvements in the properties of said structures are obtained.

The production of these elastomeric flexible cellular structures is a recent development. The structures are formed from polymeric materials which are liquid at room temperature or capable of being melted at relatively low temperatures. These polymeric materials contain active-hydrogen atoms which react with isocyanate groups to extend the molecular chain. The polyisocyanate reactant performs a threefold function in the reaction mixture. It operates to extend the chain length of the polymeric material, to react with water in the formation of carbon dioxide gas, and to cross-link or cure the chain-extended polymeric material. The carbon dioxide gas that is liberated by the reaction produces a foamed mixture which sets to an elastomeric flexible cellular structure after curing.

By the term "active-hydrogen" used to describe the polymeric materials is meant those hydrogen atoms which are reactive as measured and determined by the Zerewitinoff method. Examples of "active hydrogen" containing polymeric materials are polyesters, polyesteramides, and polyalkylene ether glycols.

The polyesters are prepared by the condensation of one or more glycols, with one or more dibasic carboxylic acids. Polyesteramides are prepared from one or more glycols, one or more dibasic carboxylic acids and relatively small amounts of one or more bifunctional amino compounds, such as amino carboxylic acids, amino alcohols and diamines. Small amounts of trifunctional materials may optionally be employed in the preparation of the polyesters and polyesteramides. The polyalkylene ether glycols are hydroxyl-terminated polyethers derived from alkylene oxides or glycols or from heterocyclic ethers such as dioxolane. Further examples of these active-hydrogen-containing materials and methods for their preparation are described in U.S. Patents 2,625,531; 2,625,532; and 2,625,535 which show polyesteramides and polyesters, and U.S. Patents 2,692,873 and 2,702,797 which show polyalkylene ether glycols. Preferred active-hydrogen-containing materials are polyesters and polyesteramides having an average molecular weight of from approximately 750 to 2,250, an acid number not greater than 5, and a hydroxyl number from 50 to 150. Best results are obtained with an active-hydrogen-containing polymeric material, with an acid number not greater than 2, a hydroxyl number of approximately 60, and a corresponding average molecular weight of approximately 1,900. It is also preferred that these materials be substantially anhydrous and contain not more than 0.2% water by weight.

Any organic polyisocyanate or mixtures of polyisocyanates may be employed to produce the elastomeric flexible structures. The amount of polyisocyanate should be sufficient to chain-extend and cross-link the polymeric material and to react with water to form carbon dioxide gas. In general, from 2 to 8 equivalents of isocyanate per mol of polymeric material may be employed with best results being obtained by the use of approximately 3 mols of diisocyanate per mol of polymeric material. Representative examples are hexamethylene diisocyanate; para-phenylene diisocyanate; meta-phenylene diisocyanate; 1,5-naphthalene diisocyanate; and 4,4'-diphenylene methane diisocyanate. The preferred diisocyanates are those which are liquid at room temperatures, such as the tolylene diisocyanates.

In the manufacture of elastomeric flexible cellular materials from polyisocyanates, active-hydrogen-containing polymeric material and water, structures which are somewhat incompletely cured are sometimes produced. In these incompletely cured structures a condition exists which has been termed "internal tack." The foamed material is somewhat "sticky." For example, when the corner of a foamed structure of optimum cure is twisted or rotated through 720 degrees, the corner immediately "snaps back" or returns to its original square shape or position. When a foamed structure having even very slight internal tack is rotated or twisted 720 degrees the corner does not immediately return to its square shape. In extreme cases the twisted structure never does return to its original shape. In other words, a foamed elastomeric flexible cellular structure with internal tack is not as "lively" as one which has been completely cured and does not possess internal tack.

Internal tack has also been found in elastomeric flexible cellular materials which originally contained none, but which developed internal tack when subjected to conditions of heat and humidity in use. Since the conditions of use are often beyond the control of the manufacturer, it is desirable to eliminate the possible subsequent occurrence of internal tack in those products subjected to severe service conditions.

It is, therefore, the broad object of this invention to provide a treatment for the elastomeric flexible cellular materials whereby this internal tack is eliminated. Another object is to eliminate the internal tack which might be present by virtue of incomplete cure of freshly prepared elastomeric flexible cellular structures. Still another object is to eliminate internal tack that has developed in elastomeric flexible cellular material under the conditions of use. Still another object is to provide a method for treating elastomeric flexible cellular structures whereby the aging properties of the structure are improved. Other objects will appear as the description of the invention proceeds.

The objects of this invention are accomplished by treating the elastomeric flexible cellular structures with silicone oil. This treatment may be applied immediately after the structures are made or any time thereafter as needed. The silicone oil may be applied in any convenient manner such as by wiping the surface with a rag impregnated with silicone oil, by using silicone oil impregnated squeeze rolls, by covering the structures with an oil-impregnated rag and then passing between squeeze rolls, by brushing or spraying the silicone oil onto the surface of the structure or by injecting the silicone oil into the cellular structure.

Silicone oils are linear polymers of the type represented by the general formula:

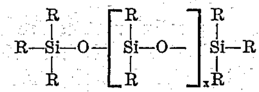

in which R is an organic radical of relatively low molecular weight such as methyl or ethyl. These oils are clear liquids which can be obtained in a wide range of viscosities as determined by the length of the polymer chain. The silicone oils have viscosities ranging from 40 to 1,000 centistokes measured at 100° F. and are marketed by General Electric, Dow-Corning and Linde Air Products.

Silicone oil applied to elastomeric flexible cellular structures readily penetrates into the body of the structure and spreads itself upon the internal surfaces thereof. It has been determined that silicone oil, when applied to small surface areas, will spread in all directions to cover a much larger area in a relatively short time. The rate of spreading of the silicone oil is increased by the flexing and compression of the treated structures. It has been found that because of the ability of silicone oil to spread over the surfaces of the cellular structure, only from 1 to 2 parts by weight of the oil per 100 parts by weight of the cellular material need be applied in order to achieve the desired results, although greater amounts may be employed if desired.

The practice of this invention is further illustrated by the following examples in which, unless otherwise noted, parts are shown by weight. These examples are to be interpreted as representative rather than restrictive of the scope of this invention.

*Example 1*

A polyester was prepared from adipic acid and approximately equal molecular amounts of ethylene glycol, diethylene glycol, and butylene glycol. To 700 parts of this polyester which had an acid number of 2 and a hydroxyl number of 60 were added 68 parts of 2,4-tolylene diisocyanate. This mixture was heated for one hour at 60° C. to form a prepolymer as described in my copending application, Serial No. 508,323, filed May 13, 1955.

From this prepolymer a foamable mixture was prepared according to the following formulation:

| | |
|---|---|
| Grams prepolymer | 100 |
| Grams 2,4-tolylene diisocyanate | 22.4 |
| Grams water | 2.75 |
| Grams castor oil | 0.85 |
| Cubic centimeters N-methylmorpholine | 0.5 |

This mixture was allowed to expand and was excessively cured in a square mold for 18 hours at 80° C. The cured material was prepared in such manner that it would display a somewhat greater degree of internal tack than would ordinarily be present, one catalyst being intentionally omitted in its preparation.

This cured material was attractive in all respects except that when a corner was twisted through 720 degrees it did not rapidly snap back to its original square shape. Two samples were cut from the cured material, one being treated with 1 to 2% by weight of silicone oil based on the weight of the sample and the other serving as a control. The internal tack, as measured by the above-mentioned poor snap-back of a corner twisted through 720 degrees, had wholly disappeared in the silicone-oil-treated sample. The two samples were aged for a period of ten months, at the end of which time the untreated sample had developed a still greater amount of internal tack and the treated sample still possessed the same "lively" snap-back it displayed immediately after the original silicone oil treatment.

*Example 2*

A flexible elastomeric cellular structure was prepared as described in Example 1 except that 0.84 gram of a catalyst was included in the formulation. The catalyst was a condensation product prepared from approximately 4 mols of butyraldehyde and 1 mol of butylamine. These condensation products and methods for their preparation are described in "The Journal of American Chemical Society," vol. 70, page 1624, for April 1948. A well-cured foam was produced which gave good snap-back when a corner was rotated 720 degrees, indicating the absence of internal tack.

Two samples were cut from the cured material. One sample was treated with an application of 1 to 2% by weight of silicone oil based on the weight of the sample. Both samples were aged for nine months. The untreated sample, when twisted through 720 degrees, did not snap back to its original shape, indicating the development of internal tack. The piece treated with silicone oil remained "lively" and snapped back when twisted 720 degrees, indicating the suppression of internal tack.

*Example 3*

A portion of the aged untreated sample of Example 2 which had developed considerable internal tack was treated with 1 to 2% by weight of silicone oil based on the weight of the portion treated, whereupon the internal tack disappeared immediately as determined by the aforementioned twist test.

The treatment of the flexible elastomeric cellular materials with silicone oil is equally effective regardless of whether the cellular materials are prepared from a prepolymer as disclosed in the above examples or whether they are formed without the preparation of the prepolymer.

This application is a continuation of my copending application Serial Number 554,421 filed December 21, 1955, now abandoned.

While certain representative embodiments and details have been shown for the purpose of illustrating the invention, it will be apparent to those skilled in this art that various changes and modifications may be made therein without departing from the spirit or scope of the invention.

I claim:

1. The method of eliminating the internal tack from elastomeric flexible cellular structure prepared by the reaction of an active-hydrogen-containing polymeric material said active-hydrogen-containing material being selected from the group consisting of polyesters, polyesteramides and polyethylene glycols having an average molecular weight of from 750 to 2,250, an acid number not greater than 5 and a hydroxyl number of from 50 to 150, an organic polyisocyanate and water, which comprises treating the said cellular structure with a silicone oil, said silicone oil being defined by the formula:

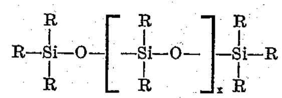

in which R is selected from the group consisting of methyl and ethyl and $x$ is a whole number, said silicone oil having a viscosity ranging from 40 to 1000 centistokes measured at 100° F.

2. A method defined by claim 1 in which the amount of silicone oil used is from 1 to 2% by weight of the total weight of the said cellular structure so treated.

References Cited in the file of this patent

UNITED STATES PATENTS

| | | |
|---|---|---|
| 2,542,619 | Bernhardt | Feb. 20, 1951 |
| 2,547,694 | Dosmann | Apr. 3, 1951 |
| 2,577,279 | Simon et al. | Dec. 4, 1951 |
| 2,625,535 | Mastin et al. | Jan. 13, 1953 |
| 2,649,090 | Parsons et al. | Aug. 18, 1953 |
| 2,664,366 | Wilson | Dec. 29, 1953 |
| 2,741,800 | Brockway | Apr. 17, 1956 |

(Other references on following page)

UNITED STATES PATENTS

| | | |
|---|---|---|
| 2,779,689 | Reis | Jan. 29, 1957 |
| 2,820,314 | Scott | Jan. 21, 1958 |
| 2,850,464 | Mitchell | Sept. 2, 1958 |

OTHER REFERENCES

Plastics, September 1948, 117–O.S., pp. 23 and 24.

Dow Corning Silicone Note Book, Fluid Series No. 3, September 1948, pp. 1 to 3, 8 and 9.

Rubber Age, vol. 76, No. 2, November 1954, pp. 239, 240, 241, 242–117–O.S.

Rubber Age, vol. 78, No. 2, November 1955, 260/2.5A, pp. 239–244.

How Firestone Uses Silicone Release Agents, Rubber Age, November 1954, pp. 239–117–O.S. 242.